United States Patent

Sprague, Jr.

[11] 3,911,173
[45] Oct. 7, 1975

[54] ADHESIVE PROCESS
[75] Inventor: Gordon V. Sprague, Jr., Danvers, Mass.
[73] Assignee: USM Corporation, Boston, Mass.
[22] Filed: Nov. 19, 1973
[21] Appl. No.: 417,352

Related U.S. Application Data
[63] Continuation-in-part of Ser. No. 329,362, Feb. 5, 1973, abandoned.

[52] U.S. Cl. .......... 427/207; 12/142 R; 36/19.5; 226/7; 226/97; 264/176 F; 427/256; 427/424
[51] Int. Cl.² .......................... B05D 7/12
[58] Field of Search .......... 156/244, 309, 291, 497, 156/295, 500, 18, 177, 166, 176, 578, 180; 264/176 R, 176 F; 117/20, 28, 24, 104 R, 105.1, 105.3, 37 R, 44, 66; 12/142 R; 36/19.5; 161/47; 425/72; 118/323; 226/7, 97; 28/15 M; 239/336

[56] References Cited
UNITED STATES PATENTS

| | | | |
|---|---|---|---|
| 1,365,061 | 1/1921 | Respess | 156/169 |
| 2,671,745 | 3/1954 | Slayter | 156/177 |
| 2,940,096 | 6/1960 | Bromfield | 117/47 H |
| 3,168,754 | 2/1965 | Rossitto | 36/19.5 |
| 3,247,536 | 4/1966 | Rossitto et al. | 36/19.5 |
| 3,278,960 | 10/1966 | Nardone | 156/244 |
| 3,483,581 | 12/1969 | Chandler et al. | 12/142 R |
| 3,483,582 | 12/1969 | Morgan | 12/142 R |
| 3,485,428 | 12/1969 | Jackson | 226/97 |
| 3,547,735 | 12/1970 | Ortel | 156/304 |
| 3,756,893 | 9/1973 | Smith | 156/181 |
| 3,773,483 | 11/1973 | Schmidt | 264/176 F |

Primary Examiner—Douglas J. Drummond
Assistant Examiner—J. J. Gallagher
Attorney, Agent, or Firm—Benjamin C. Pollard; Vincent A. White; Richard B. Megley

[57] ABSTRACT

Process for applying adhesive to a surface, particularly for attaching a tread member to a shoe in which an adhesive applicator including a jet providing a gas stream having a rotational component is constructed to extrude viscous fluid adhesive to form a filament and to lay down the filament while still soft and adhesive as a band of overlapping loops directly on the attaching surface of an element to be adhered. The elements to be joined are pressed together with the adhesive between them and the adhesive is hardened.

7 Claims, 4 Drawing Figures

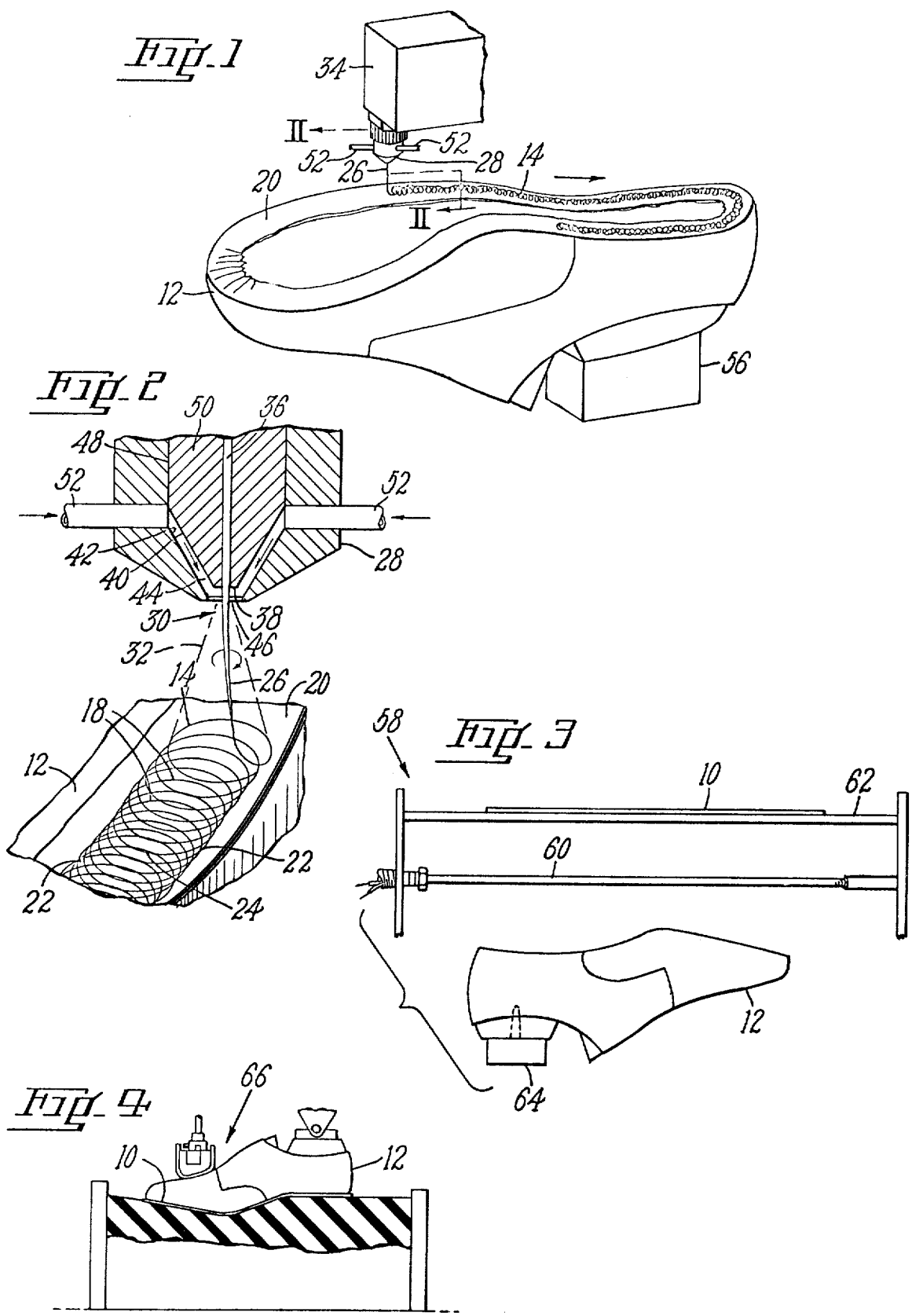

ADHESIVE PROCESS

This is a continuation-in-part of application Ser. No. 329,362, filed Feb. 5, 1973, entitled "Adhesive Process", now abandoned.

FIELD OF THE INVENTION

This invention relates to processes for applying adhesive for adhesive joining of articles, particularly the adhesive attachment of tread members to shoe uppers.

BACKGROUND OF THE INVENTION

In the U.S. patent of Edmond A. Chandler and Kenelm W. Winslow, U.S. Pat. No. 3,483,581 which issued Dec. 16, 1969, there is disclosed an adhesive process, particularly for attaching a tread member to a shoe, in which a thin open coherent sheet of thermoplastic synthetic polymeric resin adhesive strands is disposed on an attaching surface, the sheet and attaching surface are heated to a temperature above the activation temperature of the adhesive, and the surfaces to be joined are brought together while so heated with the adhesive sheet between them. Excellent bonds have been obtained by this process; but the process involves the need for positioning the sheet of adhesive strands on the attaching surface and of holding it in place. Also, heightwise variations of the attaching surface, for example, ridges of the shoe material at the toe portion of the bottom of a shoe upper and wrinkles or other irregularities may result in bridging of the preformed coherent sheet.

It is an object of the present invention to provide an adhesive process by which fine filamentary thermoplastic adhesive is deposited on the attaching surface area as an adhesive band conforming to heightwise variations of the attaching surface.

BRIEF STATEMENT OF THE INVENTION

It is a feature of the present invention to provide a process in which viscous fluid adhesive, which may be a hot melt adhesive or a solvent type adhesive is formed as a filament and is laid down in an open pattern as a band with well defined edges giving uniform adhesive coverage localized within the attaching surface area and conforming to heightwise variations of the attaching surface.

It is a further feature of the present invention to provide a process in which fluid adhesive, either molten thermoplastic adhesive or solvent type adhesive, is deposited in filamentary form as a band on an attaching surface area under conditions which provide superior adhesive wetting of that area and in which the adhesive may be activated under conditions giving spreading and adhesive engagement with an attaching surface of an element to be joined and to the first surface when the elements are pressed together.

The invention will be described in connection with the drawings in which:

FIG. 1 is a diagrammatic angular view with parts broken away of a cementer laying down a band of overlapping loops of adhesive filaments on the attaching margin of a shoe upper;

FIG. 2 is a fragmentary elevational view of an enlarged scale with some parts in section taken on line II—II of FIG. 1 showing a form of adhesive depositing nozzle and illustrating the deposition of band of loops of adhesive filaments on an edge margin of a shoe upper;

FIG. 3 is a diagrammatic elevational view showing the heating of the adhesive filament band and shoe upper and the heating of the attaching surface of an outsole of a shoe upper; and FIG. 4 is a diagrammatic elevational view showing the bonding of an outsole to an upper in a sole attaching press.

DESCRIPTION OF THE INVENTION

The present process is useful in a variety of relations for adhesively joining elements particularly relatively thick elements, invention elements through which it is difficult to supply heat for activating adhesive as in the bonding of thread elements to the attaching surfaces of shoe parts. Thus, the process may be used to secure outsoles to shoe bottoms, to secure heels to heel attaching surfaces and in other relationships. The bonding of outsoles to shoe uppers is a particularly difficult problem because of the stresses involved in use and the following description will refer to bonding of outsoles to shoe uppers. It is to be understood, however, that the process and apparatus are not limited to this application of the invention.

In the attaching of outsoles 10 to shoe uppers 12 in accordance with the process of the present inventionn a band 14 of adhesive filamentary material is disposed in the form of overlapping loops 18 on the attaching surface portion 20 of a hoe upper 12 as shown in FIGS. 1 and 2. In an alternative procedure, not illustrated, the adhesive may be supplied to the attaching surface of the outsole rather than the shoe upper. It will be observed that the edge portions 22 of the band 14 provide a relatively higher amount of adhesive per unit length of band than do central portions 24 since the portions of the loops adjacent the edges are at smaller angles to the general direction of the band 14 and therefore provide a greater length of adhesive filament per loop 18 in these edge portions 22. Central portions 24 of the band 14 are made up of spaced filament loops 18 overlapping other spaced filament loops 18 leaving a substantial proportion, for example, at least about 25% or more of the overall space in the central portion 24 free of adhesive. The loops 18 remain distinct where they are formed from molten thermoplastic adhesive, but may flow together into an allover coating where they are formed from solution type adhesive.

Deposition of the filamentary material in the described configuration is achieved by extruding a filament or strand 26 of viscous fluid adhesive from a nozzle 28 spaced from the attaching surface 20 and providing a gaseous jet 30 surrounding the extruded adhesive which operates both to attenuate the extruded material into a thin filament and to guide the filament in a generally circular path such that the path of the filament generates a substantially conical envelope 32. Movement of the attaching surface 20 at a rate correlated with the rate at which the adhesive is extruded and with the frequency of rotation generates the overlapped loop configuration.

The applying nozzle 28 is mounted on a supply device 34 for providing viscous fluid adhesive under pressure and, as shown in more detail in FIG. 2, includes a channel 36 which receives the adhesive for extrusion from the adhesive nozzle extrusion orifice 38. The outer surface 40 of the adhesive nozzle tapers substantially conically toward the extrusion orifice 38 and cooperates with an inwardly tapering conical member 42 to define an annular conical passage 44 for a suitable gas, such as air, terminating in orifice 46 disposed to direct the gas at adhesive extruded from the orifice 38 of the adhesive nozzle. The conical member 42 is supported on the upper portion 48 of the nozzle member 50 which provides the channel 36 for carrying the fluid adhesive, so that the rear portion of the annular passage 44 is sealed. Gas for the jet is supplied through one or more inlet openings 52.

Movement of the adhesive filament 26 to form the loops 18 may be effected by providing that the jet of gas have a rotational component as well as a component in the direction of the surface on which adhesive is to be deposited. This rotational component may be provided in various ways as, for example, the provision of vanes or other guides (not shown) in the annular space 44 in the nozzle 28 or by controlling the velocity or direction at which gas is supplied to the nozzle 28.

A useful nozzle construction involves disposition of air inlet openings 52 in generally opposed relation as shown in FIGS. 1 and 2, with a minor offset, which may be of the order of 0.010 inch from diametrical positioning to create the desired high rotational or swirling motion in the air in the air passageway 44. With such an arrangement it has been found that the motion of the air has produced movement of the filament at a rate giving over 35,000 loops per minute. High rates, e.g., from 15,000 to 50,000 loops per minute give a particularly desirable structure and arrangement in the band of looped filaments for application of cement at a relatively high linear speed. But, lower rates are also useful.

It will be understood that while one configuration of nozzle has been shown, other configurations including other locations, numbers, arrangements and directions of air and adhesive passages and channels may be useful to form the filament and guide it in loops for forming a band of adhesive.

To aid in proper control of the extrusion and deposition, the following discussion of effects of the various factors may be of assistance. It has been found that as the rate of supply of a given fluid adhesive to the extrusion nozzle is increased, there is a corresponding (a) increase in diameter of the filament; (b) reduced degree of attenuation and (c) a reduction in both the diameter of the loops and in the rate of loop formation, i.e., loops per second.

Increase of air velocity has an effect essentially opposite to that of increase of rate of supply of adhesive. That is, increased air velocity will (a) reduce the diameter of the adhesive filament; (b) increase the attenuation of the filament and (c) both increase the diameter of the loops and the rate of loop formation.

The effect of increase in viscosity is somewhat similar to the effect of increasing the rate of supply to adhesive to the extruder, namely, it will (a) result in increased diameter of the filament; (b) reduce the degree of attenuation of the filament and (c) both reduce the diameter of the loops formed and the rate at which the loops are formed.

It has been found that the diameter of the filament is a useful guide since, if the diameter of the filament becomes too large, the diameter of the loops will become reduced and develop irregularity with corresponding uneven distribution of adhesive and unsatisfactory band edge definition. The maximum filament diameter will vary with different adhesives; but as a rough guide, it appears that in deposition of molten thermoplastic adhesives, the diameter should preferably be between about 0.002 inches to about 0.007 inches.

The amplitude of the loops 18 and therefore the width of the adhesive band is also dependent on the distance of the nozzle 28 from the surface. Greater distance of the nozzle from the surface serves to give loops of greater amplitude. Ordinarily, the distance of the nozzle from the surface should not be over about 3 inches to insure control of the deposition pattern. Also, particularly in deposition of molten thermoplastic adhesive, it has been found important to supply heated gas to the gas nozzle, particularly with the higher nozzle to surface distances, to avoid premature cooling of the extruded adhesive and of the surface which might interfere with the desired adhesive engagement with the surface. Generally, the temperature of the air jet should be within about 100°F. of the temperature of the extruded molten adhesive. Higher velocity of the gas also gives finer filaments and increases the frequency of the rotary motion so that it will result in giving more loops of finer filamentary material.

One form of cementer (see FIGS. 1 and 2) comprises coaxial adhesive and air nozzle orifices 38 and 46 for forming the filaments and directing them to lay down the overlapping loop band on the attaching surface 20 of the shoe upper and suitable means (not shown) for moving the attaching surface 20 at a desired rate beneath lateral relation to the nozzle. In the device shown, molten cement for extrusion to form a filament is supplied from the melting device 34 adapted for supplying adhesive under pressure to the extrusion nozzle.

As shown schematically in the drawing, a lasted shoe upper 12 is mounted with its attaching surface 20 up on a support 56 movable to cause the attaching surface to travel at a uniform speed and lateral relation beneath the adhesive filament supplying nozzle with the distance from the nozzle 28 maintained for proper band width. It will be noted that since there is no engagement between the adhesive nozzle 28 and the attaching surface 20, the adhesive can be laid down uniformly as a band 14 of overlapping filament loops 18 even around sharp corners as in a pointed toe shoe, where a contacting applicator member would have difficulty negotiating the corner and would tend to both deposit excessive adhesive at that sharp corner and to wipe away adhesive already deposited by the applicator in approaching the corner. It will be understood that while the applying motion has been described as involving movement of the support 56 carrying the lasted shoe upper 12, the deposition may be secured by movinng the adhesive applying nozzle 28 relatively to the stationary shoe upper 12 or by a combination of movements of the shoe upper 12 and of the adhesive applying nozzle 28. The cementer may be operated to apply a band 14 of the overlapping loop filament adhesive extending around at least the forward portion of the surface 20 of the attaching margin of the shoe upper as shown in FIG. 1 and the band may extend around the entire attaching margin depending on the shoe construction involved. A considerable variation is obtainable as to the width and filament thickness making up the band, i.e., the band may have a width of from about ¼ inch to about 1½ inches, and the filaments may have a diameter of from about 0.002 inch to about 0.007 inch. For use in shoe sole attaching, band widths of from about seven/sixteenths inch to about ⅝ inch are preferred and a filament thickness coordinated with the number of filaments per unit length of the band to provide from about 13 to about 52 mg. of adhesive per centimeter of length.

Particularly in the application of molten thermoplastic adhesive, it is desirable to heat the surface 20 on which adhesive is to be deposited before the filamentary material is laid down since without preheating it appears that the adhesive may not wet the surface as satisfactorily as where the surface is preheated. It is preferable to heat the surface to as high a temperature as possible without damaging the material of the surface. Thus, leather may be preheated to about 160°F. while a synthetic upper material would be preheated to about 125°F. It is believed that improved wetting adhesive engagement is due to the fact that the freshly formed filament 26, for example of hot melt adhesive, is still largely amorphous condition and hence flows more readily into wetting relation with the preheated surface. On the other hand, if the filament 26 is deposited on a cold surface, some degree of crystallization of the adhesive may occur before activation and band completion so that even when the surface is brought to activation temperature, the adhesive may not reach as fluid a condition as when freshly formed because of residual crystals or crystallites in the adhesive filaments. Another advantage of the preheating step is that it helps to maintain flexibility and tackiness of the deposited filament so that the deposited filament can both follow irregularities in heightwise direction existing in the surface on which deposited and establish wetting adhesive relation to the entire attaching surface including such irregularities.

The preferred thermoplastic adhesive for deposition from molten condition in looped arrangement, according to the present method, involves a special combination of physical characteristics for effective operation. In general, the adhesive must be thermoplastic at least to the extent that it does not set up prior to completion of the two heating operations involved in the present process. Resins which have been found useful include the polyesters and copolyesters from reaction of dicarboxylic acids and glycols or from lactones or mixtures of these, polyamides from reaction of dicarboxylic acids and diamines or from lactams or mixtures of these, polyesteramides, for example, adipic polyesteramides in which the hydroxy component is 1,6-hexanediol, 1,4-butanediol or ethylene glycol, stereo specific catalyzed polymers of vinyl alkyl ethers where the alkyl group has from one to four carbon atoms, polymers and copolymers of lower alkyl acrylates and methacrylates. Resins having molecular weights preferably not over about 50,000 have been preferred in order that they may have the necessary fluidity for formation into filaments for wetting and penetration. Mixtures of polymer materials having molecular weights above this value, with resins of lower molecular weight may be compounded to approximate the physical properties of the preferred resins for use in the present process. It has been found desirable that the adhesive having a relatively wide temperature range, preferably a range of at least 20°C. in which it is visco-elastic when cooled from molten condition. The term visco-elastic refers to a condition in which the adhesive is somewhat rubbery but deformable and flowable under pressure, in order that it may avoid excessive "squeeze-out" under the high pressures involved in sole attaching while at the same time permitting limited movement, for example, of the outsole 10 relative to an upper 12, so that accurate positioning of the outsole relative to the upper may be assured even after the outsole has come in contact with the adhesive. The temperature range in which the visco-elastic condition in the preferred adhesives occurs may be from about 10°C. to about 60°C. below the melting point of adhesive; and the adhesive will harden to a strong, tough condition at temperatures at least as high as 50°C. Other important properties are relatively high strength, toughness and at least limited flexibility at room temperature in order that the adhesive may successfully withstand the severe stresses encountered in the use of a shoe.

A useful class of adhesives is that of the polyesters, for example, terephthalates, isophthalates, sebacates, succinates, etc. Preferred polyesters include condensates of a lower alkylene glycol such as ehtylene glycol or butylene glycol with dicarboxylic acids, for example, condensates of 1,4-butanediol with mixed terephthalates and isophthalate components in the molar ratio of from about 1:1 to about 4:1 and condensates of ethylene glycol and 1,4-butanediol and mixtures of these with mixed terephthalate, isophthalate and sebacate components in percentages of 40% to 60% terephthalate, 20% to 50% isophthalate and 10% to 20% sebacate. These polyesters are prepared by condensation to have melting points of from 80°C. to 200°C.

A viscous fluid adhesive for extrusion as a filament and laying down as a band of overlapping loops may also be a solution type adhesive which is normally a solution in a volatile organic solvent of a synthetic polymeric resinous material. For use in the present process it is necessary that the adhesive solution have a character and be deposited under conditions in which the solution is extruded as a contiinuous filament and is not broken up into droplets or fibrils by the deposition procedure. Synthetic polymeric resinous materials for use in adhesive solutions will be essentially linear, preferably, long chain polymers forming smooth viscous solutions substantially free from disruptive gel structure or cross linked portions. Materials of this type include polyamides, copolyamides, polymers and copolymers of acrylic and methacrylic esters, polymers and copolymers of vinyl acetate, essentially linear elastomers including polyurethanes, epoxy resins and cellulose derivatives, e.g., cellulose acetate and cellulose nitrate. That is, when the fluid adhesive is extruded from the nozzle, the axial component of the gaseous jet operates to attenuate the extruded material. This attenuation effect an at least limited orientation of the polymer molecules and requires a slipping of one chain relative to an adjacent chain. Interference of gel particles or cross linked portions or other regularities in the extruded material would interfere with the smooth attenuation and tend to break the extruded material with formation of fibrils or droplets.

Some of the technology developed in the spinning of textile fibers is of value in selecting appropriate conditions for the present extrusion deposition of solution type adhesives, although it must be kept in mind that the final condition of the solution type adhesives at the point of deposition in the present case is as a viscous liquid where the textile fibers are collected as firm discrete fibers. It is known from textile fibers spinning procedures that the rate of extrusion has an upper limit, empirically determined, which, if exceeded, results in so-called "melt fracture" and in the present case, it is important to keep the rate of extrusion below the rate at which "melt fracture" appears. The rate of attenuation must also be controlled to avoid disruption of the extruded strand or filament and this empirically determined factor is known to depend on the attenuating drag force of a gaseous jet acting on the strand or filament. In the present case this drag is controlled not only by the velocity and point of application (relative to the end of the extrustion nozzle) of the gaseous jet, but also by the length of strand or filament between the nozzle opening and the surface on which the strand or filament is deposited. That is, the greater the distance between the nozzle and surface of deposition, the longer the portion of filament acted on by the gaseous jet and therefore the greater the surface area of the strand or filament on which the gaseous jet can exert an attenuating force. It can be observed that where the nozzle is only, for example, 1 inch from the surface on which the adhesive is to be deposited, a substantially thicker filament is formed then where the distance between the nozzle and the surface of deposition 1 ½ inches.

Briefly summarized, following the general rules established for textile fibers spinning, the solution type adhesive will be controlled as to its composition, namely, a volatile organic solvent solution of a substantially linear long chain polymer; and a percentage of solvent will be used which will maintain the viscosity at a relatively high value but low enough to be extruded at the desired rate without "melt fracture." Usual solids contents for useful adhesives may be in the range of from about 25% to about 35% by weight but solids contents up to about 50% could be used where viscosity low enough for extrusion, attenuation and wetting out of the surface permits. The direction, velocity and point of application of the gaseous jet will be controlled to limit attenuation to that capable of application without breaking the extruded filament; and the distance between the nozzle and the surface will be set at a value allowing sufficient attenuation of the extruded strand or filament, as well as, not so great a distance as to provide excessive attenuating action of the gaseous jet on the filament or strand.

In addition to these elements of control which are generally analogous to those involved in textile fiber spinning, the solution type adhesive composition preferably contains a proportion of solvent at least sufficient to maintain the extruded composition tacky and preferably flowable to adequately wet out the surface for bond strength at the point of deposition on the surface taking into account the loss of solvent by the action of the gaseous jet; and the composition may contain sufficient solvent so that the deposited filament is still fluid and the deposition loops flow together into a continuous uniform band with sharply defined edges.

While the above discussion has laid emphasis on the action of the solvent in controlling viscosity in solution type adhesives during deposition by the present process, it will be understood that solution type adhesives may also be extruded at elevated temperatures in which both the heat and solvent cooperate to lower the viscosity of the adhesive composition. In these operations the solvent in some instances may be regarded as a plasticizer and the adhesive composition as an essentially thermoplastic adhesive and in these cases, the solvent may largely evaporate after extrusion either before or after the filament is deposited on the surface to form an adhesive band.

The next step of the process involves heating the attaching surface 20 of the shoe upper with the deposited adhesive filament band 14 thereon and heating the attaching surface of the outsole 10. Reactivation of the adhesive through this heating step and assembly of the outsole 10 and shoe upper 12 within a short time, suitably one-half minute after deposition of hot melt adhesive, will be more effective than heating for reactivation after this time because of the development of crystallization in the deposited adhesive which starts to be observable after this time and which becomes an increasing factor. That is, crystallization is progressive and the extent of crystallization will be at an intermediate stage for about two weeks. It is noted that although prompt activation and assembly is preferred, it is possible by using higher temperatures or longer heating times to secure effective activation even with a partially or fully crystallized adhesive.

Various types of heating may be employed such as a stream of hot gas or high frequency magnetic or electrical field; but radiant heating has been found particularly satisfactorily.

Heating may be achieved as shown in the FIG. 3 using a heating device 58 including a radiant heating element 60 with suitable work supports such as a rack 62 disposed above and pin type support 64 for the lasted shoe upper below the heating element 60. Where the adhesive is applied to the attaching surface 20 of the shoe upper 12, the lasted shoe upper 12 will be mounted on the pin support 64 and moved into heating relation with the radiant heat source 60 while the outsole 10 will be disposed on the grid 62 above the heat source. Where the adhesive is applied to the outsole, the outsole may be disposed on a grid below the radiant heat source and the upper mounted on a support (grid and support not shown) disposed above the heat source. The radiant heating element 60 not only heats the band 14 of filamentary material, but, because of the large proportion of openness in the band, is effective also to raise the temperature of the attaching surface of the shoe upper 12 underlying the band. Thus, the heating action brings the attaching surface 20 of the bottom of the shoe upper 12, the band 14 of filamentary adhesive can wet and adhere to the heated attaching surfaces to hold them together. For example, with a band of which the adhesive has a melting point of 280°F., this heating may involve exposure to an infrared heater at a spacing of 3 inches for a period of 15 seconds. The extent of heating is not particularly critical and is readily determined for any selected deposit of filamentary adhesive. It is desirable to keep the temperature at a minimum consistent with activation of the adhesive to minimize the in-press time.

After the attaching surface 20 of the upper 12 and the band 14 of filamentary adhesive on the attaching surface of the outsole 10 have been heated, the sole 10 and upper 12 are removed from the heating device 58 and assembled promptly while the temperatures of the adhesive and the attaching surfaces of the sole and upper are sufficient to secure the wetting and adhesive action, and the assembly is, without delay, placed in a sole attaching press 66 (see FIG. 4) and subjected to sole attaching pressure. Pressure in the sole attaching press may be released in a matter of only a few seconds and the adhesive will hold the outsole firmly on the shoe upper after release pressure.

The following examples are given as a possible aid in understanding the invention, but it is to be understood that the invention is not limited to the materials, conditions or procedures of the examples.

EXAMPLE 1

A crystallization copolyester resin was prepared by condensation and polymerization of a reaction mix of the following composition in percent by weight: 18.4% isophthalic acid, 36.8 terephthalic acid, 35.2% by weight of 1,4-butanediol and 9.5% by weight of a polycaprolactone diol. The polyester had a melting point of from about 146°C. to 150°C. (ball and ring) and a viscosity as determined at 200°C. with the Instron Rheometer at 50 reciprocal seconds shear rate of 90,000 to 140,000 cps.

The copolyester was supplied to a melter and brought to a temperature of 450°F. to 475°F. and supplied to the extrusion nozzle of the cement applicator at the rate of 20 grams per minute. The extrusion nozzle diameter was 0.020 inch. Air at 600°F. was supplied to the air passages of the nozzle which was constructed as shown in FIG. 2 with opposed air inlets off set about 0.010 inch from diametrical relation to generate a rotational component in the jet leaving the nozzle at the rate of 50 standard cubic feet per hour at a pressure of 12 lbs. per sq. inch gauge, the diameter of the air channel of the nozzle being 0.125 inch providing an annular nozzle 0.020 inch across. Movement of the filament by the air was at a rate of about 35,000 loops per minute.

A lasted leather shoe was mounted on a pin and the bottom exposed to a radiant heat element for 5 seconds which raised the surface temperature to 160°F. Thereafter, the preheated shoe was mounted on a support for movement of the attaching surface at a distance of 0.75 inch from the nozzle and at a rate past the nozzle of 7 inches per second. On movement of the shoe with its attaching surface disposed to catch the adhesive, a band of overlapping loops of adhesive was deposited along a width of about one-half inch.

Within 20 seconds the lasted shoe upper was mounted on a pin with it attaching surface facing a radiant heat source and exposed to this source for 4 seconds which raised the cement temperature to above 350°F. and also heated the spaces of the attaching surface not covered by the adhesive filaments. At the same time a leather outsole was supported with its attaching surface exposed to a radiant heat source to raise its temperature to 160°F. On reaching temperature, the outsole was placed with its attaching surface against the adhesive filaments on the attaching surface of the shoe upper and the assembled upper and outsole were placed in a sole-attaching press which applied an attaching pressure of 200 psi for 10 seconds. On removal from the press, it was found that the sole was strongly attached to the shoe upper, that the edges of the sole were tight to the shoe upper and that there had been no squeeze out of adhesive.

EXAMPLE 2

A lasted shoe upper of polyvinyl chloride shoe upper material was mounted on a pin and the bottom exposed to a radiant heat element for 4 seconds which raised the surface temperature to 130°F. Thereafter, the preheated shoe was mounted on a support and a band of overlapping loops of adhesive disposed on the attaching surface along a width of about one-half inch using the copolyester resin adhesive and applying conditions used in Example 1.

Within 20 seconds the lasted shoe upper was mounted on a pin with its attaching surface facing a radiant heat source and exposed to this source for 4 seconds which raised the cement temperatures to about 350°F. and also heated the spaces of the attaching surface not covered by the adhesive filaments. At the same time a resin-rubber synthetic outsole was supported with its attaching surface exposed to a radiant heat source to raise its temperature to 120°F. to 130°F. On reaching temperature, the outsole was placed with its attaching surface against the adhesive filaments on the attaching surface of the shoe upper and the assembled upper and outsole were placed in a sole attaching press which applied an attaching pressure of 200 psi. for 10 seconds. On removal from the press it was found that the sole was strongly attached to the shoe upper, that the edges of the sole were tight to the shoe upper and that there has been no squeeze out of adhesive.

Temperatures of soles and shoe uppers given in the body of the specification, the Examples and the claims are those determined by a contact surface pyrometer, unless otherwise specified, and it is to be understood that the actual temperatures may be somewhat higher as determined by an optical pyrometer which eliminates heat capacity effects.

EXAMPLE 3

A viscous adhesive was prepared by dissolving a thermoplastic linear polyester urethane elastomer in a solvent mixture of approximately equal parts of tetrahydrofurane and methyl ethyl ketone, the solids content of this solution being about 20%. The urethane elastomer was a commercial product ("Estane") substantially free from cross links obtained by reaction of 1 mol of an —OH terminated polyester, an aliphatic glycol and a diphenyl diisocyanate in proportions leaving essentially no unreacted isocyanate or hydroxyl groups. The resulting solution had a viscosity at room temperature of from about 2,000 to 3,000 cps. as determined by the Brookfield Viscometer.

The adhesive solution was supplied to the extrusion nozzle of the cement applicator at the rate of 33 grams per minute. The extrusion nozzle diameter was 0.020 inches. Air was supplied to the air passages of the nozzle which was constructed as shown in FIG. 2 with opposed air inlets offset from diametrical relation to generate a rotational component in the jet leaving the nozzle. The air was supplied at the rate of about 50 standard cubic feet per hour at a pressure of 12 lbs. per sq. inch gauge, the diameter of the air channel of the nozzle being 0.140 inches providing an annular clearance of 0.030 inches. Adhesive solution leaving the extrusion nozzle was continuous cohesive streams and remained so even when attenuated and caused to move in a rotational manner by the air jet such that the streams it defined a conical envelope. Rotational movement of the filament was at the rate of about 30,000 loops per minute.

A lasted leather shoe was mounted on a support for movement of its attaching surface at a distance of about 1 inch from the nozzle and at a rate past the nozzle of about 4.8 inches per second. On movement of the shoe with its attaching surface disposed to catch the adhesive, a band of loops of adhesive was deposited along a width of about nin-sixteenths inch and these loops were sufficiently flowable that the loops flowed together to form a uniform overall coating of about 0.032 inch thickness with well-defined edges over the surface area marked out by the bond. The applied cement was allowed to dry overnight giving a dry cement bond about 0.007 inch thick.

The shoe upper was disposed with its attaching surface and dried cement band facing the radiant heat source and exposed to this source to raise the cement temperature to about 230°F to 260°F. as measured by an infra-red optical pyrometer. At the same time, a leather outsole carrying a 0.007 inch dry thickness coating of the same cement on its attaching surface was supported with its attaching surface exposed to a radiant heating source to bring its temperature to about the same value.

On reaching temperature, the outsole was assembled with its adhesive coating against the adhesive coating on the bottom of the shoe upper and the assembled upper and outsole were placed in a sole attaching press which applied an attaching pressure of 200 psi. for 10 seconds. On removal of the press, it was found that the sole was strongly attached to the shoe upper, that the edges of the sole were tight to the shoe upper and that there had been no squeeze out.

Having thus described my invention and what I claim as new and desire to secure as Letters Patent of the United States is:

1. The process of applying adhesive to the surface comprising the steps of extruding viscous fluid adhesive as a filament into a gaseous jet from a point spaced from said surface, said jet having one component of movement in the direction of said attaching surface acting on said filament to attenuate it into a thin filament and a rotational component about an axis corresponding to the direction of said one component acting to guide the filament in a circular path progressively increasing in diameter as it moves away from said point to gererate a substantially conical envelope and to deposit loops of said adhesive filament on said surface while the filament is still soft and adhesive, and moving said surface ralative to said point whereby successive loops of said adhesive filament are deposited on said surface as a band of overlapping loops.

2. The process of applying adhesive to a surface as defined in claim 1 in which said adhesive comprises molten thermoplastic synthetic polymer resin.

3. The process of applying adhesive to a surface as defined in claim 2 in which the band of overlapping loops of adhesive filament has an open area of at least 25% of the overall area of said band, said gaseous jet is supplied to said nozzle at a temperature such that it is within about 100°F. of the temperature of the molten adhesive extruded from said nozzle, said surface is maintained at a distance from said nozzle selected to provide the desired width of band but not over about 3 inches and in which the speed of movement of said surface relative to said nozzle is correlated with the rate of supplying of molten adhesive from said nozzle to provide a predetermined amount of adhesive per unit length of said band.

4. The process of applying adhesive to a surface as defined in claim 3 in which the temperature and rate of supply of adhesive to the extrusion nozzle and of gas to the gaseous jet are controlled to provide a filament diameter of from about 0.002 inch to about 0.007 inch.

5. The process of applying adhesive to a surface as defined in claim 4 in which the temperature of said molten adhesive at point of extrusion, the temperature and velocity of the gaseous jet and the distance between said extrusion and said surface are coordinated to insure that said adhesive is in substantially amorphous condition when it reaches said surface and in which said surface is heated prior to receiving said filament to insure wetting adhesive engagement with said surface.

6. The process of applying adhesive to a surface as defined in claim 1 in which said adhesive is a viscous solution of a synthetic polymer resin in a volatile organic solvent.

7. The process of applying adhesive to a surface as defined in claim 6 in which the rate of supply of adhesive to the extrusion nozzle, the solids content of said adhesive at the point of extrusion, the velocity of the gaseous jet and the distance between said nozzle and said surface are coordinated to insure that said adhesive is in flowable condition when it reaches said surface to wet out and adhere to said surface and to flow together to form a substantially continuous cover of the surface within the edges of said band.

* * * * *

UNITED STATES PATENT OFFICE
CERTIFICATE OF CORRECTION

Patent No. 3,911,173   Dated October 7, 1975

Inventor(s) Gordon V. Sprague, Jr.

It is certified that error appears in the above-identified patent and that said Letters Patent are hereby corrected as shown below:

Column 11, Cl. 1, Line 31, after to and before surface, delete the and insert --a--

Column 12, Cl. 5, Line 26, after extrusion and before and, insert --nozzle--

Cl. 7, Line 40, after said and before nozzle, insert --extrusion--

Signed and Sealed this twenty-seventh Day of January 1976

[SEAL]

Attest:

RUTH C. MASON
Attesting Officer

C. MARSHALL DANN
Commissioner of Patents and Trademarks